United States Patent
Rodgers

[15] 3,650,905
[45] Mar. 21, 1972

[54] STACKED MICROPOROUS VAPOR PERMEABLE MEMBRANE DISTILLATION SYSTEM

[72] Inventor: Franklin A. Rodgers, Brookline, Mass.
[73] Assignee: Pactide Corporation, Cambridge, Mass.
[22] Filed: Feb. 11, 1971
[21] Appl. No.: 114,584

Related U.S. Application Data

[63] Continuation-in-part of Ser. No. 102,811, Dec. 30, 1970, abandoned, which is a continuation-in-part of Ser. No. 838,872, July 3, 1969, abandoned, and a continuation-in-part of Ser. No. 838,769, July 3, 1969, abandoned.

[52] U.S. Cl. .................................203/10, 203/89, 202/172, 202/177, 202/176
[51] Int. Cl. .......................................B01d 3/00, B01d 3/02
[58] Field of Search...................202/173, 174, 172, 177, 176, 202/178, 179, 235, 236; 203/10, 11, 89

[56] References Cited

UNITED STATES PATENTS

| | | |
|---|---|---|
| 3,245,883 | 4/1966 | Loebel....................................203/11 X |
| 3,340,186 | 9/1967 | Weyl........................................203/10 X |
| 3,388,045 | 6/1968 | Goeldner et al. ......................203/11 X |
| 3,361,645 | 1/1968 | Bobell.....................................202/197 X |
| 3,385,769 | 5/1968 | Brose.......................................202/197 |
| 3,406,096 | 10/1968 | Rodgers..................................202/172 |

Primary Examiner—Norman Yudkoff
Assistant Examiner—David Edwards
Attorney—Brown and Mikulka

[57] ABSTRACT

A distillation system incorporating a multiple stage still comprising microporous membranes in which heated and deaerated feed liquid is utilized, in part, as distilland, and in part, as a heating liquid for transferring heat to the distilland within the still to generate a thermal gradient and effect heat transfer required to produce distillate from the distilland. The feed liquid employed for heating is returned to a deaerator heater where it is combined with additional feed liquid to replace the distillate and effluent distilland liquid. Heat is transferred from the effluent and distillate to the additional feed liquid prior to introduction thereof into the deaerator heater.

15 Claims, 10 Drawing Figures

INVENTOR.
FRANKLIN A. RODGERS

INVENTOR.
FRANKLIN A. RODGERS
BY Brown and Mikulka
and
Robert E. Corb
ATTORNEYS

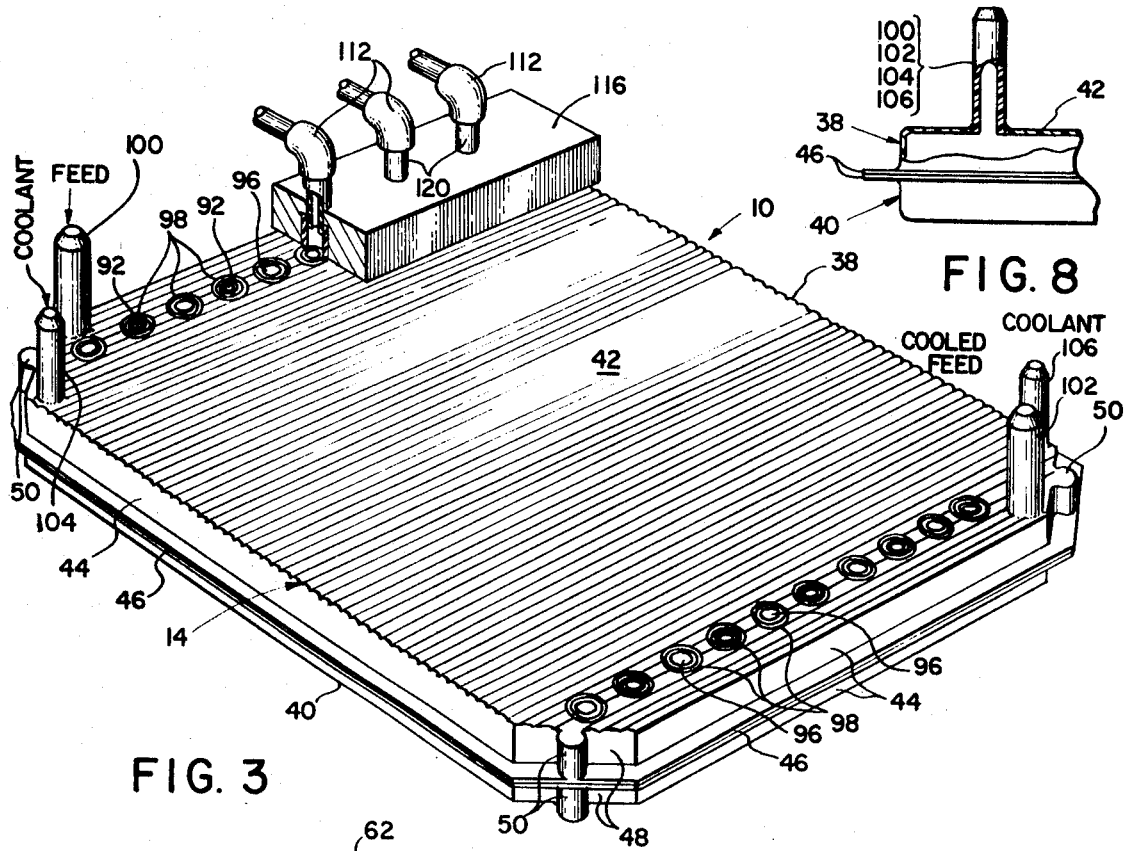
FIG. 3
FIG. 8
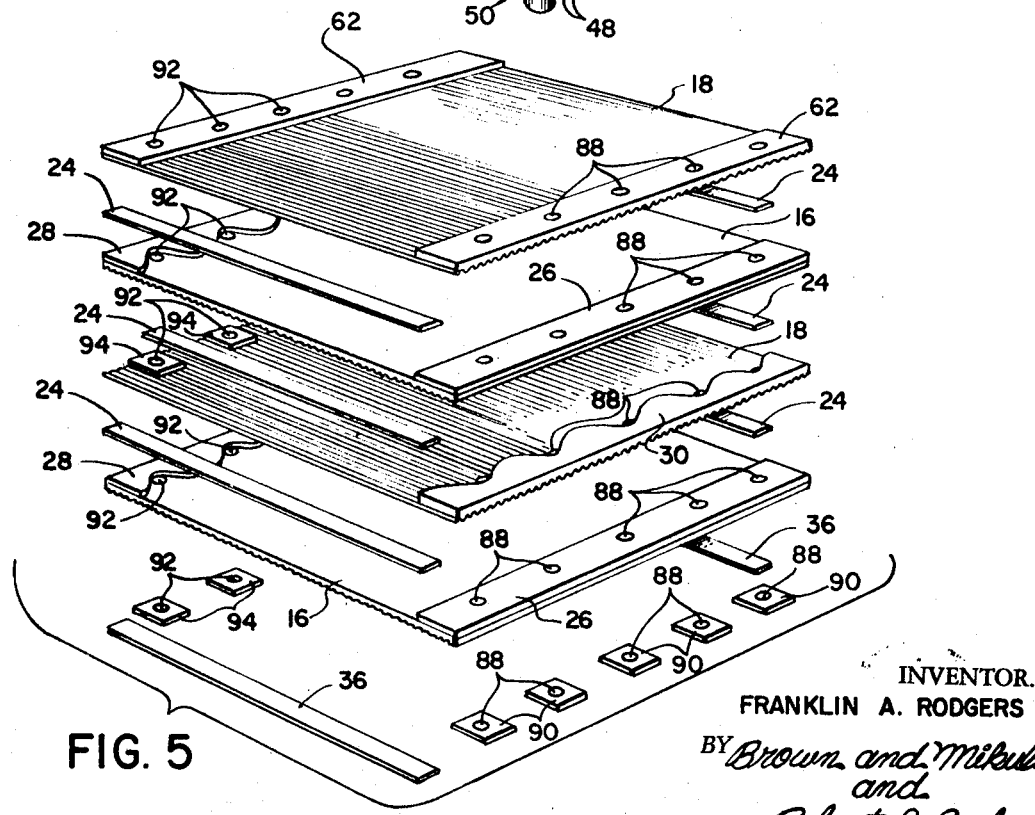
FIG. 5
INVENTOR.
FRANKLIN A. RODGERS
ATTORNEYS

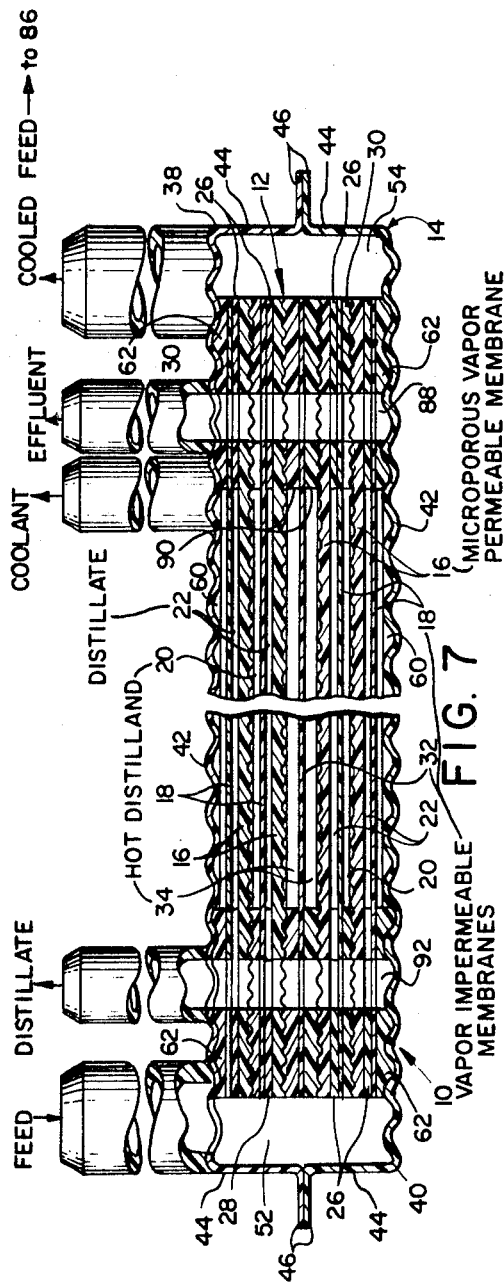
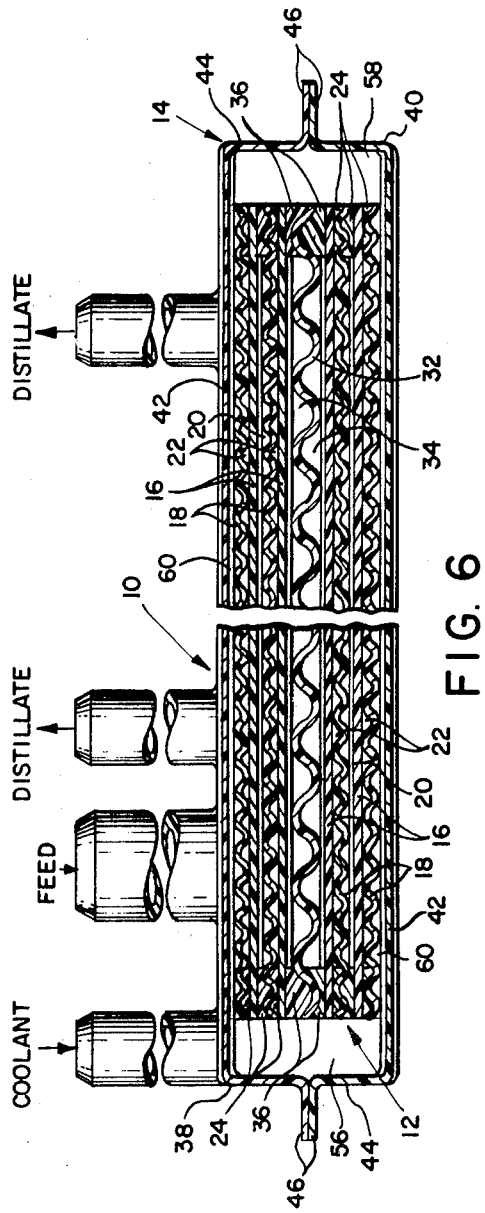

STACKED MICROPOROUS VAPOR PERMEABLE MEMBRANE DISTILLATION SYSTEM

This application is a continuation-in-part of my copending application Ser. No. 102,811 filed Dec. 30, 1970 and now abandoned as a continuation-in-part of applications Ser. Nos. 838,872 and 838,769 both filed July 3, 1969 and now abandoned.

BACKGROUND OF THE INVENTION

This invention relates to distillation and, more particularly, to a system and method of desalination utilizing selective heating and cooling of different portions of a multiple stage still incorporating microporous membranes.

A number of U.S. patents and copending applications disclose distillation systems and processes particularly adapted to the demineralization, e.g., desalination, of water, in which a feed or distilland liquid such as salt water is circulated in contact with one side of a microporous membrane permeable to the vapor of the liquid and impermeable to the liquid itself under the operating conditions. A distillate liquid, e.g., distilled water, is maintained in contact with the opposite side of the membrane. Heat is transferred to the distilland liquid to vaporize it while heat is transferred from the distillate liquid to cause the vapor of the liquid to pass through the membrane and be condensed as distillate. Multiple stage distillation systems are described in which the heat from the distillate of each stage is transferred to the distilland of a succeeding stage and so forth. In systems of this type, several membranes or sections thereof are arranged in stacked relation with alternate barriers which cooperate to form channels on opposite sides of each membrane for distilland and distillate liquids. Distillation methods of this type are described in applicant's U.S. Pat. Nos. 3,406,096, 3,477,517, and 3,497,423; U.S. Pat. No. 3,340,186; and in applicant's copending application Ser. No. 524,366, filed Dec. 27, 1965.

A preferred embodiment of the distillation apparatus disclosed in applicant's aforementioned patents and application includes a multiple stage distillation unit in which both the microporous membranes and the spacers are formed of polymeric materials, the spacers being in the form of thin films. Suitable materials for the membranes are those which lend themselves to the formation of microporous membranes having a high proportion of voids, e.g., 70 to 80 percent, and uniform pore distribution and which are either inherently poorly wettable or non-wettable, e.g., hydrophobic, by the distillate liquid or can be treated to render them poorly wettable or non-wettable by the liquid. Examples of polymers particularly adapted to the formation of membranes useful in water desalination are disclosed in the aforementioned patents and application and include the fluorocarbons such as polytetrafluoroethylene and polyvinylidene fluoride are preferred because they are inherently poorly wettable by water. Methods of manufacturing microporous membranes of this type are known in the art and include solvent—non-solvent systems such as disclosed for example in the copending U.S. Pat. application of James L. Bailey et al., Ser. No. 790,192 filed Jan. 3, 1969, as a continuation-in-part of and replacement for Ser. No. 577,593, filed June 16, 1966. Polymeric materials useful as the barrier films are selected according to criteria including compatibility with the liquids involved, cost, ease of fabrication and assembly, useful operating temperatures and thermal conductivity. Polymers particularly suited for water desalination include polycarbonates, polyesters, polyethylene, polypropylene and halogenated polyethylenes, particularly the fluorocarbons.

In a distillation unit of this type, the barrier films are corrugated to provide channels for the flow of distillate and distilland liquids in contact with opposite sides of the porous membranes which are secured to adjacent barrier films in selected regions particularly at the edges of the membranes and/or barrier films to control the circulation of the liquids and confine the liquids to their proper channels. In a typical distillation system such as disclosed in the aforementioned patents and applications, the membrane and barrier films are rectangular and stacked with their edges in alignment and secured to one another adjacent their edges to form a parallelepiped shaped unit. This unit comprising the membranes and films is coupled with external means for introducing liquids into and withdrawing liquids from the unit, means for transferring heat to the unit and means for transferring heat from the unit. To conduct particular liquids to selected channels within the unit, aligned holes are provided through the stacked membranes and films and a selected channel is blocked in regions surrounding the aligned holes in the membrane and film defining said channel in order to prevent the flow of liquid into or from the selected channel through the holes in the membrane and film. The external means for introducing into and withdrawing liquids from the unit as well as transferring heat to and from the unit generally comprise a pair of plates or headers between which the stack of membranes and films comprising the unit are engaged, together with liquid conduit means such as manifolds, coupled with the holes in the outer films of the unit for introducing and withdrawing liquids means for heating one of the headers and means for cooling the other header. Thus, a still of this type constructed according to the prior art comprises a unit formed of stacked membranes and films enclosed at least on two sides by heating and cooling elements as well as liquid conducting means for coupling holes in the unit with external accessories such as circulating pumps, heat exchangers for recovering heat from the product and effluent liquids, and liquid pretreatment devices for filtering, deaerating and chemically treating the feed liquid.

OBJECTS OF THE INVENTION

It is an object of the present invention to provide an improved desalination system including means for heating and cooling selected portions of a multiple stage still and utilizing heated feed liquid as both the distilland and the heating medium.

It is another object of the present invention to provide an improved method of distillation which includes the steps of transferring heat to an incoming source liquid externally of the still and then utilizing this heated liquid both as distilland and as a heat exchange liquid to achieve the requisite thermal gradient within the multiple stage still.

It is a further object of the present invention to provide an improved desalination system and method of desalination which is more efficient in operation and more economical to construct and use.

Other objects of the invention will in part be obvious and will in part appear hereinafter.

SUMMARY OF THE INVENTION

Briefly, the foregoing objects are achieved by a desalination system incorporating a multiple stage still including means for heating and cooling selective portions of the still utilizing the distilland liquid for heating the still.

It is the usual practice in distillation apparatus of the type described, particularly in desalination apparatus utilizing source or feed water having dissolved solids in addition to salts, to provide means for preventing the feed liquid (water) to remove substances that might cause scaling, corrosion or the like, within the still itself and/or within associated heat exchange devices such as heaters, deaerators, etc. It is also the practice to treat the heating liquid, that is, the liquid employed to heat the still so that there will be a substantial investment in both the feed and heat exchange liquids in terms of treatment prior to heating thereof so that a substantial savings can be realized by utilizing the same liquid as both distilland and for heat transfer and heating this same liquid by the same means. External heating of the distilland is effected, in part, by transferring heat to the distilland from the distillate and the effluent. Heat transfer within the still is effected by circulating heated distilland through selected portions of the still while circulating a coolant liquid through other portions of the still. In this manner a favorable thermal gradient is established, preferably from the center of the still outward toward the exterior thereof and economies of operation are realized in that the same treated, heated distilland liquid is utilized both as feed and as a heat transfer medium.

Additionally an improved method of desalination results because the heat transferred to incoming source water employed both as feed and as a heating medium, is conserved while the produce and effluent are circulated through a heat exchanger and the heated source water cooled as a result of its use as a heat transfer medium, is reheated and recirculated as both feed and the heat transfer medium. Consequently, the resulting system utilizes source water at ambient temperatures as the input liquid while the product and effluent, at or near ambient temperature, constitute the output liquids.

The invention accordingly comprises the apparatus possessing the construction, combination of elements and arrangement of parts, and the method involving the several steps and the relation and order of one or more of such steps with respect to each of the other which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 3 is a perspective view of another embodiment of the still;

FIG. 5 is an exploded, perspective view of components of the still shown in FIG. 4, illustrating the method of fabrication and assembly;

FIG. 6 is an enlarged, elevational, sectional view of the still taken substantially along the line 6—6 of FIG. 2;

FIG. 7 is a view similar to FIG. 5, the section being taken substantially along the line 7—7 of FIG. 2;

FIG. 8 is an elevational view of a portion of the distillation system illustrating the details thereof;

Figure 1:
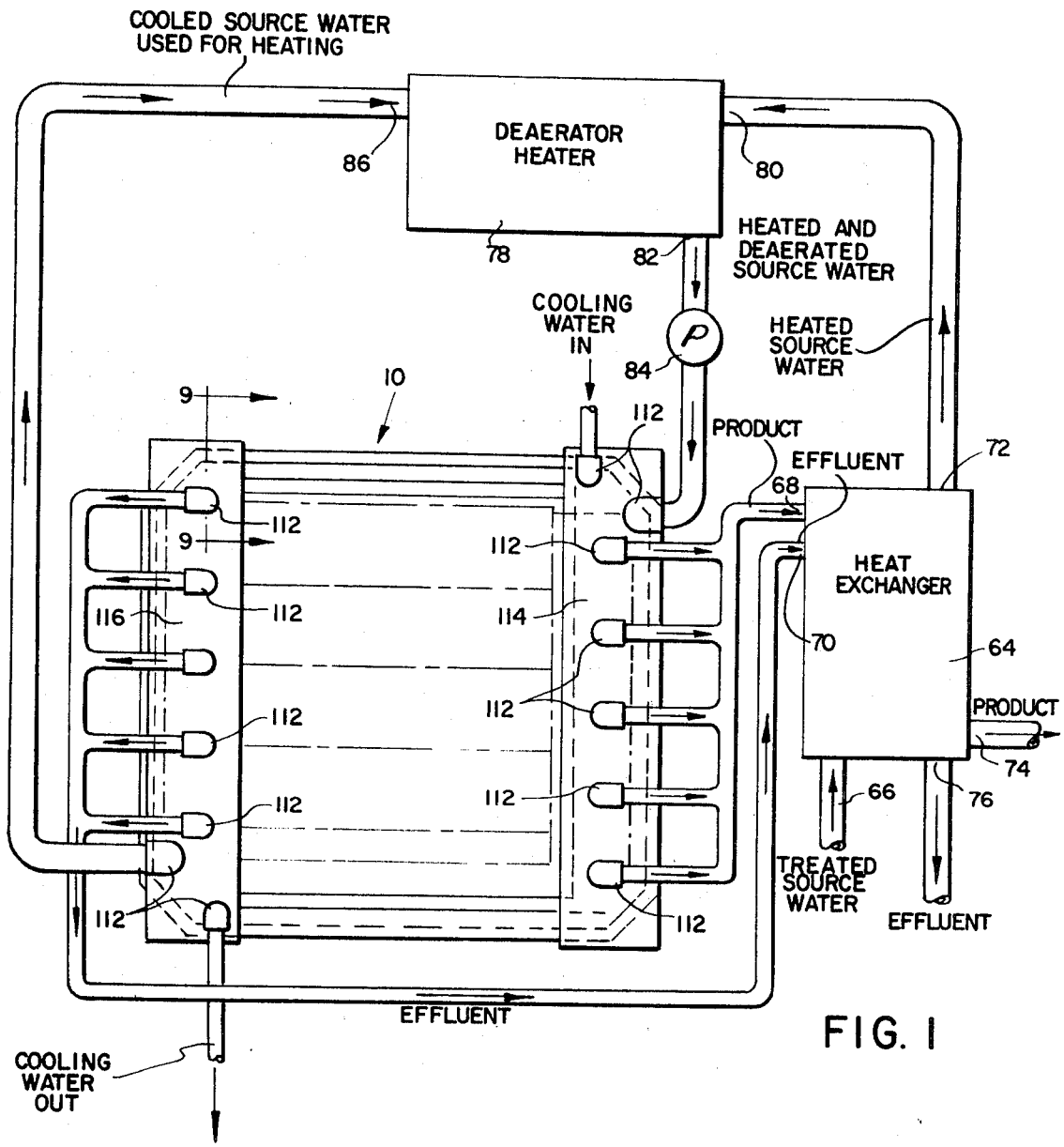
FIG. 1 is a somewhat schematic illustration of a distillation system constructed in accordance with the invention.
Figure 2:
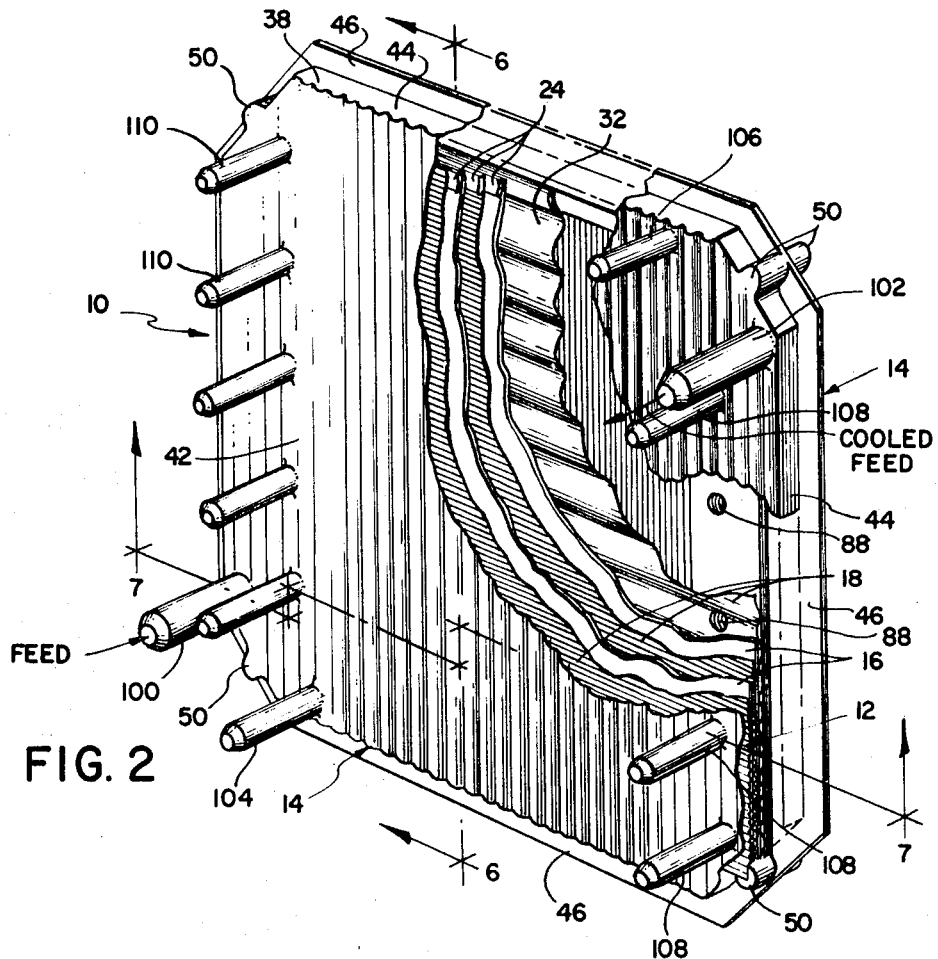
FIG. 2 is a perspective view of a still incorporated in the distillation illustrated in FIG. 1.
Figure 4:
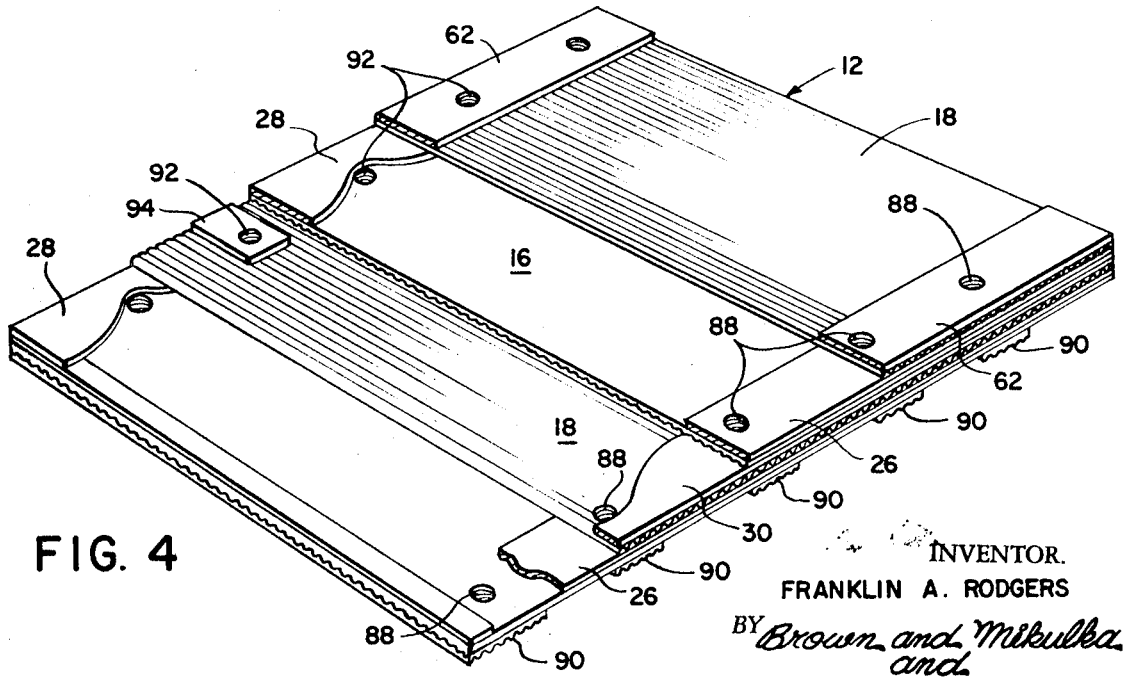
FIG. 4 is a perspective view of components of the stills of FIG. 2 and 3 shown with parts broken away.

Reference is now made to FIGS. 1 through 3 of the drawings wherein there is illustrated a multiple stage distillation system and still embodying the invention. The distillation system shown in FIG. 1 includes a still generally designated 10, including, as basic components thereof, a multiple stage distillation unit 12 composed of a multiplicity of porous membranes and barrier films secured together in stacked relation and enclosed in a housing designated 14. The distillation unit 12 comprises a multiplicity of sheetlike elements all substantially rectangular, having the same dimensions and arranged with their edges in alignment so that unit 12 takes the form of a relatively thin parallelepipedon.

The components of unit 12 include a multiplicity of microporous, vapor permeable membranes 16 and liquid and vapor impermeable barrier films 18. The membranes and barrier films are arranged in face-to-face relation in alternating order to form two rectangular stacks which are joined together in a manner to be described to form unit 12. Each membrane 16 is preferably formed with a smooth or plane surface and another surface having a corrugated appearance, being formed with alternating parallel depressions and raised sections having a generally sinusoidal configuration. As previously noted, each membrane is formed with a high proportion, e.g., on the order of 80 percent, of microscopic through passages or pores for conducting the vapor of a liquid, such as water, while preventing the passage of liquid by capillary action. Although polymeric materials useful for the membranes and methods of manufacture are disclosed in the aforementioned patents and applications, particular mention should be made of polyvinylidene fluoride as a preferred membrane material and the so-called "solvent—non-solvent" casting process as the preferred method of forming the membrane, such processes having been described in U.S. Pat. Nos. 1,421,341, 3,100,721, and 3,208,875 as well as the aforementioned Bailey et al. applications.

Although the construction and composition of barrier films 18 is described in the aforementioned patents and application, it should be noted that the preferred polymeric material for the barrier films is a polycarbonate such as sold by General Electric Co. under the trademark "Lexan." Films 18 are corrugated so that when interposed between adjacent porous membranes 16, as shown in FIGS. 6 and 7, the corrugations will contact the surfaces of the porous membranes forming channels for the flow of liquids in contact with the membranes. As indicated in the drawings, the corrugated barrier films 18 cooperate with porous membranes 16 to form a multiplicity of distilland channels 20 each bounded on one side by a microporous membrane and through which a feed or distilland liquid such as salt water is circulated; and a multiplicity of distillate channels 22 bounded by the opposite sides of the membranes in which vapor of the distilland liquid is condensed to form distillate liquid.

The essential components of a distillation stage of the still include a microporous membrane 16 through which the vapor of the distilland is transferred and means such as barrier films 18 cooperating with the membrane to form distillate and distilland channels. For the purpose of clarity of illustration, the thickness of the components have been exaggerated and the still is shown in the drawings as including only four distillation stages. However, it should be understood that in actual practice, such a still would normally comprise a very large number of distillation stages, for example, as many as 180. The actual number of stages, however, will depend upon the temperature differential between the hottest and coldest stages and the temperature differential between succeeding stages. In the multiple stage still, (see FIGS. 6 and 7) heat is transferred to the distilland liquid in the distilland channel (or channels) 20 of the first or hottest stage (or stages) to vaporize the distilland liquid. Heat is transferred from the distillate liquid of the last or coldest stage (or stages) of the still to condense the vapor transferred through the adjacent membrane to form distillate in a distillate channel 22. In each stage, energy is transferred as flux, i.e., vapor, through the porous membrane and then transferred by conduction through the adjacent barrier film from the distillate to the distilland liquid of the next succeeding stage. In the preferred form shown in the drawings, the still comprises two series of distillation stages with the first or hottest stages being located innermost and successive cooler stages arranged outwardly therefrom. Thus, distillation unit 12 comprises two inner porous membranes 16 and, alternating outwardly therefrom, barrier films 18 and additional porous membranes, four membranes and four barrier films being illustrated in the drawings.

The distillate and distilland are formed and separated from one another to confine and conduct the flow of the liquids within the channels by damming or blocking the channels in selected regions. The channels are dammed or blocked by sealing elements located within the channels between adjacent membranes and barrier films and bonded to the facing surfaces of the membranes and films. The distilland channels are located on the inner or hot side of each microporous membrane 16 and the distillate channels are located on the opposite sides of the membranes from the distilland channels. The channels are blocked in such a way that the flow of the distilland and distillate liquids is in parallel directions from end-to-end of unit 12 and in the form shown, sealing elements 24 are bonded to the opposite lateral margins of adjacent membranes and barrier films to prevent the admission or escape of liquids from the distilland and distillate channels at the sides thereof. The distillate channels 22 are blocked at opposite ends by sealing elements 26 and 28 secured between and to the end marginal surfaces of adjacent membranes and barrier films between the cold side of each membrane and the hot side of the adjacent barrier film. The distilland channels 20 are blocked at one end, termed the exit end, by sealing elements 30 also bonded to the end marginal surfaces of adjacent membranes and barrier films. The opposite ends of the distilland channels remain open at the edges of the membranes to permit the introduction of distilland liquid into the distilland channels.

Means are provided for introducing a liquid into or withdrawing a liquid from a particular channel at or near the end thereof at which the channel is blocked. These means include outlets or conduits provided by holes formed in alignment through the stack of membranes, barrier films and sealing elements. Where the hole is formed in a sealing element within a particular channel, there is no communication between the channel and the hole because the channel is blocked in regions surrounding the hole. However, where the channel remains unblocked in regions surrounding the hole, there will be communication between the hole and the channel. In this way, each group of aligned holes through stacked membranes, films, and sealing elements forms a conduit communicating with selected channels.

Distillation unit 12 comprises two sets of membranes and barrier films secured together in face-to-face stacked relation by sealing elements bonded to the membranes and barrier films. Each of these stacks, one of which is shown in exploded form in FIG. 5, is bounded on one face by a microporous membrane 16, on its opposite face by a barrier film 18 and includes a multiplicity (one of each are shown) of barrier films and membranes arranged in alternating order between the outer membrane and barrier film. A pair of these stacks are arranged with membranes 16 in spaced face-to-face relation separated by corrugated spacer 32. Spacer 32 is formed of a liquid and vapor impermeable polymeric sheet material such as a polycarbonate and is corrugated so as to cooperate with the adjacent membranes 16 to form heating channels 34 through which a heating liquid is circulated for transferring heat to the still to help establish thermal gradients from the inside of the still outwardly towards the exterior thereof. The thickness of the sheet material comprising spacer 32 may be substantially greater than the thickness of the sheet material comprising barrier films 18 and the corrugations in spacer 32 are substantially deeper, e.g., have a greater amplitude than the corrugations in barrier films 18, so that the flow capacity of channels 34 is substantially greater than the flow capacities of channels 20 and 22 defined by the corrugations in the barrier films. The corrugations of spacer 32 are parallel with the corrugations of the barrier films, and spacer 32 is secured to the adjacent membranes 16 and channels 34 are blocked at their lateral edges by sealing elements 36. By virtue of this construction, a heating liquid can be introduced into channels 34 at one end edge of the stack and withdrawn from the channels at the opposite end edge thereof after giving up heat to the liquids within the distillate and distilland channels during its passage through channels 34. In the preferred embodiment of the invention, the heating liquid is the feed or distilland liquid, e.g., salt water, so that a portion of the heating liquid circulated through channels 34 is transferred as vapor through the microporous membranes 16 defining the sides of the heating channels.

Distillation unit 12 is enclosed within a housing 14 providing for circulation of the various liquids including the feed liquid utilized both for heating as the distilland, and the cooling liquid. In the form shown in FIGS. 2, 3, 6 and 7, housing 14 comprises first and second complementary sections 38 and 40, each having a generally rectangular main wall 42 and dependent side walls 44 each formed with a flange 46. Housing sections 38 and 40 are secured to one another at flanges 46 to form a shallow chamber having length and width dimensions exceeding the length and width of unit 12 and a depth dimension, measured between main walls 42, approximately equal to the dimensions of unit 12. To facilitate fabrication and assembly, housing sections 38 and 40 are preferably identical in size, shape and conformation. Thus, only one set of tools is required and selective assembly is made unnecessary.

The corners of the housing are chamfered to form dependent corner walls designated 48 disposed at 45° angles with respect to dependent side walls 44 and including projecting sections 50 for receiving the corners of unit 12 located within the chamber provided by housing 14. A sealant adapted to adhere to the housing sections and the edges of distillation unit 12 is introduced into projecting sections 50 to form a seal between the corners of unit 12 and corner walls 48 of the housing to form chambers between the side walls of the housing and the edges of unit 12, these chambers being designated first, second, third, and fourth and numbered 52, 54, 56, and 58, respectively. First chamber 52 is located at the edge of unit 12 at which distilland channels 22 are unblocked or open while second chamber 4 is located at the opposite side of unit 12 where all of the channels, except heating channels 34 are blocked. Thus, feed or distilland liquid introduced into first chamber 52 will enter and flow through distilland channels 20 and heating channels 34 toward the opposite side of the unit. The portion of the heated distilland liquid which passes through the heating channels 34 and is cooled during its passage, is collected within fourth chamber 54 from which it is conducted from the still.

First and second chambers 56 and 58 are located at the other two sides of the still; that is, at the sides thereof at which all of the distilland, distillate, and heating channels are blocked and in cooperation with main walls 42, provide coolant channels designated 60 through which a coolant liquid may be circulated in contact with outer barrier films 18 of unit 12. Main walls 42 are formed with corrugations similar to those in spacer 32 and disposed at right angles to the latter so as to cooperate with outer barrier films 18 to form coolant channels 60. The coolant channels are blocked at their sides to prevent flow of liquid into and from third and fourth chambers 56 and 58 by sealing elements 62 bonded to the facing surfaces of outer barrier films 18 and main walls 42 at the end margins of the outer barrier films. By virtue of this construction, a coolant liquid introduced into third chambers 56 will be conducted through channels 60 against the outer surfaces of unit 12 to fourth chamber 58 from which the coolant liquid may be withdrawn, thus establishing thermal gradients across sections of unit 12 between heating channels 34 and coolant channels 60.

Still 10 is a component of a distillation system illustrated somewhat schematically in FIG. 1 including means for supplying and circulating heating, cooling, and distilland liquids to and through the still; means for treating the feed liquids; and means for transferring heat to and from the various liquids. The preferred system shown is specially designed to produce distilled water from source water containing dissolved solids such as salts, and includes a conventional heat exchanger 64 into which a feed liquid such as pretreated saline water from a suitable source is introduced at inlet 66. The hot product or distillate, e.g., distilled water, and the hot effluent, e.g., concentrated salt water, withdrawn from still 10 are introduced into heat exchanger 64 at respectively inlets 68 and 70 are circulated through the heat exchanger to transfer heat to the treated source water which is withdrawn from the heat exchanger at outlet 72. The cooled product and effluent are discharged from the heat exchanger through respectively outlets 74 and 76. The pretreatment of the source liquid, for example salt water, may be conventional and performed in a known manner. It will usually include filtration to remove solid matter and chemical treatment to remove scale-producing agents such as sulfates and carbonates.

In the distillation system illustrated in FIG. 1, the heated feed liquid from the heat exchanger is introduced into a deaerator heater 78 through an inlet 80 where, in the case of water, the feed liquid is heated to its boiling point and noncondensable gases such as air are removed from the liquid. The heating means might take the form of electrical resistance heater, electrolytic heater, a gas or an oil fired heat exchange device depending on the availibility of a particular form of energy. Additionally, deaerator heater 78 may include control means such as a thermostat for sensing the temperature of the incoming source water and controlling the operation of the means for heating the incoming source water.

Channels 34 have a depth or flow capacity many times that of the distilland channels 20 so that the volume rate of flow of the source liquid employed primarily as heat exchange liquid and circulated through channels 34 to establish a thermal gradient, exceeds the combined volume rate of flow of the distilland liquid through the distilland channels of several stages of the still. Thus, although the liquid transferred as vapor across the innermost porous membranes which bound each of channels 34 across any other porous membrane 16 from the feed liquid circulated through a distilland channel 20, the amount of liquid transferred is small in proportion to the quantity of liquid circulated. Accordingly, the increase in concentration of dissolved solids, e.g., salt, in the liquid employed for heating is so small that the cooled heating liquid, withdrawn from the still, may be introduced together with incoming source water and recirculated through deaerator heater 78. The heated and deaerated feed liquid is withdrawn from the deaerator heater through outlet 82 and circulated by a pump 84 to and through the still wherein a portion of the heated feed liquid is circulated as distilland, while another portion thereof is circulated through channels 34 as the heating liquid to help establish and maintain the requisite temperature gradients within the still. During passage of the heating liquid through channels 34, vapor will pass from the liquid through innermost membranes 16 to form distillate. The cooled heating liquid, as it exits from the heating channels, has a substantial value by virtue of both its pretreatment to remove unwanted constituents both mechanically, as by filtering, and chemically to remove agents such as those which are corrosive and/or produce scale and heat content and accordingly, recirculated to the deaerator where it is introduced at inlet 86. The increase in salt concentration of the recirculated heating liquid is relatively small and the quantity of the recirculated feed liquid is small relative to the quantity of new or additional feed liquid introduced in the deaerator heater, so that the salt concentration of the heated and deaerated feed water introduced into the still by way of pump 84 will be only slightly greater than that of the source water alone and will not effect the operation of the still. On the other hand, the utilization of the valuable heating liquid and the conservation of the heat energy by virtue of the recirculation of the heating liquid coupled with the transfer of heat from the product and effluent to the feed liquid will result in a substantial cost-savings and increase operating efficiency of the system.

In the operation of the still, the heated distilland liquid, e.g., saline water, is caused to flow through the distilland channels between adjacent membranes and barrier films in a direction parallel with the direction of the corrugations of the barrier films. The distillate or product is formed by condensation of vapor in the distillate channels and in the preferred from of still shown, is withdrawn from the end of the still at which the distilland liquid is introduced so that flow of distillate is counter to flow of distilland. The distilland liquid is introduced into the distilland channels at one end of unit 12 from chamber 52 and flows through the distilland channels to conduits 88 formed by aligned holes also designated 88 in the membranes 16, barrier films 18 and sealing elements bonded together by the sealing elements including elements 26 and 62, as well as additional sealing elements 90 located within heating channels 34 and bonded to the opposite surfaces of spacer 32 and the adjacent surfaces of membranes 16. Sealing elements 90 are spaced from one another to permit flow of the heating liquid through the heating channels into second chamber 64 while blocking the channels in regions surrounding conduits 88 thereby preventing flow of the heating liquid into conduits 88.

Similar conduits 92 are provided at the opposite end of the still for withdrawing distillate liquid from the distillate channels 22. Conduits 92 are constituted by the walls or holes, also designated 92, formed in the membranes, barrier films, and sealing elements 62 and additional sealing elements 94, similar to elements 90, provided within the distilland channels 20 and heating channels 34. Elements 94 function to block the channels in regions surrounding conduits 92 to prevent the flow of the feed liquid into conduits 92 through which the distillate is withdrawn from the distillate channels. Conduits 88 and 92 are offset from one another so that each of conduits 88 is aligned with a space between a pair of conduits 92 and vice versa for reasons which will appear hereinafter. It will be noted that sealing elements 28 and 30, which block the ends, respectively, of the distillate and distilland channels are formed with indentations such that conduits 88 and 92 open into the distilland and distillate channels respectively. It will also be apparent that because of the spacing of the conduits formed through the membranes, barrier films and sealing elements, there is required to be some flow of the distillate and distilland liquids transverse to the direction of the corrugations in barrier films 18. To facilitate this lateral flow, the indentations in each of sealing elements 28 and 30 are separated by projecting sections to form a dam having a sinusoidal edge configuration tending to guide the flow of the liquid toward conduits 88 and 92.

As previously noted, the surface of each porous membrane 16 defining one side of each distilland channel is formed with alternating ridges and grooves or corrugations, extending perpendicularly to the corrugations of barrier films 18. This construction is provided to reduce the possibility of blockages within the distilland channels due, for example, to scaling and to facilitate the flow of the distilland transverse to the barrier film corrugations in the regions of conduits 88. The transverse corrugations or grooves in the facing surfaces which bound each distilland channel 20 perform several functions tending to eliminate blockages due to scale buildup and facilitating lateral flow. First, the transverse corrugations tend to increase turbulence within the distilland liquid which in turn tends to prevent scale accumulation and adherence thereof to the membrane and barrier film surfaces. Should any scale buildup occur within a channel formed by a groove in a barrier film, the grooves in the adjacent membrane will provide alternate paths or channels around the obstruction thereby eliminating regions of stagnant liquid in which the concentration of the scale producing agents might tend to buildup and produce additional scale. The turbulent flow and alternate channels provided between the transverse grooves also tend to prevent particulate matter from becoming lodged in the distilland channels and, in the event that a particle does become lodged in a distilland channel, provide alternate channels around the particle to prevent occurrence of stagnant regions tending to result in scale buildup. Still another function of the grooves in the porous membranes is to provide channels for the transverse flow of the distilland liquid in the regions of conduits 88. This is particularly important in these regions where the concentration of dissolved solids in and the temperature of the distilland is greatest thus making conditions more conducive to scale formation.

As previously noted, the sealing elements are preformed of an adhesive material adapted to bond to adjacent membranes, barrier films, the main walls of the housing and spacer 32. The sealing elements are preformed by casting a solution of a thermosetting adhesive to form a sealing element of the desired shape and thickness. Suitable sealing elements can be formed by solvent casting such materials as an acrylo nitrile phenolic rubber base adhesives such as sold by B. F. Goodrich Company under the designation A864–B, on a silicone release paper and air drying the adhesive solution to form a layer having a thickness of the order of 1 to 3 mils. The adhesive may either be cast in the desired shape or as a layer which, following drying, may be cut into sections of the desired size and shape.

The distillation unit 12 is then assembled by alternately positioning and stacking the membranes, barrier films, and sealing elements and spacer and then subjecting the stack of the assembled components to heat and pressure to activate and cure the adhesive thereby binding the membranes, films, and spacer to one another to form the various channels. Conduits 88 and 92 are then formed by the simple expedient of drilling through the unit, a conventional paper drill being suited for this purpose.

Except for connections between conduits 88 and 92 and chambers 52, 54, 56, and 58, the remainder of the assembly process involves locating unit 12 between housing sections 38 and 40 together with sealing elements 62 and subjecting the assembly, i.e., still 10, to heat and pressure to bond sealing elements 62 to main walls 42 of the housing. The flanges 46 of the two housing sections are secured to one another either by conventional methods such as the use of an adhesive or by welding. An adhesive or sealant in fluid form is introduced into projecting sections 50 to form a seal between the corner walls of the housing and the corners of unit 12 to divide the housing into chambers 52, 54, 56, and 58. Sealants suitable for this purpose include room temperature vulcanizing silicone rubbers having a low enough viscosity to permit introduction into projecting sections 50 by way of a hollow needle or syringe.

Figure 10:
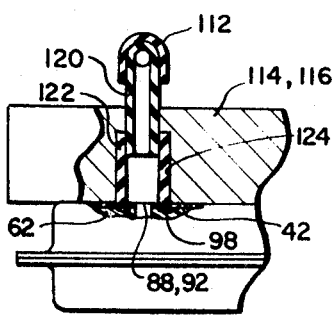
FIG. 10 is an elevational, sectional view similar to FIG. 9, illustrating another embodiment.
Figure 9:
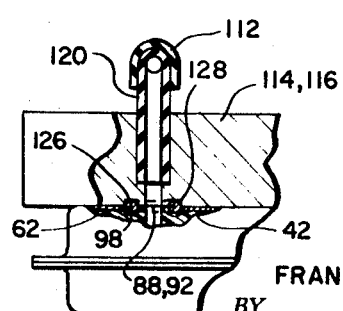
FIG. 9 is an elevational, sectional view of a portion of the distillation system of FIG. 1, the section being taken substantially along the line 9—9 of FIG. 1.

As illustrated in FIGS. 3, 9, 10, each main wall 42 is formed at opposite ends with a row of circular, flat areas 96 each surrounded by an annular groove 98. The flat areas 96 are arranged such that each of conduits 88 and 92 will underlie a flat area 96 when the distillation unit 12 is assembled within housing 14. Thus, there will be twice as many flat areas at each end of the still as there are conduits 88 and 92 so that the housing sections can be reversed end for end or additional conduits may be provided at either or both ends. To complete the still, holes are drilled through the flat area 96 so as to communicate with conduits 88 and 92.

A variety of means are provided for introducing liquids into and withdrawing liquids from still 10, specifically for introducing heated and deaerated feed liquid into first chamber 52, withdrawing the cooled and partially depleted heating liquid from second chamber 54, withdrawing the effluent liquid from distilland channels 20 by way of conduits 88, withdrawing distillate liquid from distillate channels 22 by way of conduits 92, introducing coolant liquid into third chamber 56, and withdrawing the coolant liquid from fourth chamber 58. These means are those structures which provide connections between external liquid conduits and main wall 42 of housing section 38 to couple the external conduits with internal conduits 88 and 92 and chambers 52, 54, 56, and 58. In the embodiment of still 10, illustrated in FIGS. 2 and 8, these connections are made by way of nipples or short tubes 102, 104, 106, 108, 110 attached to the main wall of housing section 38. Nipples 100, 102, 104, 106, 108 are secured to main wall 42 surrounding the openings therein for conducting the liquids into or from respectively chambers 52, 54, 56, and 58. Nipples 108 are secured to forward wall 42 surrounding holes 88 in the forward wall and nipples 110 are secured to the forward wall around holes 92. Since the feed input through nipple 100 is at a flow rate greater than the flow through any other nipple, the internal diameter thereof will be larger than the diameter of nipples 108 and 110 which may be substantially the same in embodiments in which the effluent flow rate approximates the product flow rate. The nipples may be formed of the same material as the housing and may be attached to the forward wall 42 in any conventional manner such as by welding or by a suitable adhesive. The nipples are connected to external conduits by conventional means such as elbows 112 formed of an elastomer or flexible polymer.

In the embodiment of the still shown in FIG. 3, the connections for the feed and cooled feed liquid, and coolant liquid are made by way of nipples 100, 102, 104, and 106 as described above. However, means are provided for making direct connection with conduits 88 and 92 without the necessity for attaching nipples 108, 110 to the forward walls. This construction has the advantage of making the connecting means a permanent part of the distillation system and facilitates replacement of still 10, the component of the entire system most likely to require replacement. These means for making connections to the still to provide for removal of effluent and product liquid are illustrated in FIGS. 1, 3, 9, and 10 and include blocks 114, 116 adapted to be clamped against main wall 42 overlying walls 88 and 92 respectively. Each of the blocks is formed with a plurality of bores 118 adapted to be aligned with holes 88 and 92 and a tube or nipple 120 is engaged in each bore 118 and projects therefrom so as to couple with an external conduit by way of an elbow 112.

Two alternate systems are shown for making a connection between a tube 120 and a portion of the forward wall comprising annular groove 98 surrounding each of holes 88 and 92. In the form shown in FIG. 8, these means comprise a tube 122 formed of an elastomer and engaged in a counterbore 124 in the block (114 or 116). Tube 122 projects beyond the surface of the block facing the main wall 42, and is held in liquid-tight engagement with the forward wall within annular groove 98 when the block is pressed against the main wall. In the embodiment shown in FIG. 9, a conventional O-ring 126 is provided in a counterbore or annular groove 128 surrounding bore 118 (in block 114 or 116) and is adapted to be pressed into sealing engagement with annular groove 98 in main wall 42 when the block is pressed against the main wall. This latter structure has the advantage of simplicity and the fact that the seal becomes more effective when the pressure is increased. Thus by virtue of this construction, all of the connections between the still and the external conduits for withdrawing effluent and product liquids from the still can be made simply by clamping blocks 118 against the still.

In the novel system of the invention, the treated, heated and deaerated source liquid performs dual functions. A portion is circulated through the still for the purpose of promoting heat transfer within the still and another portion of the heated and deaerated source liquid is circulated as distilland. A coolant liquid such as untreated source liquid can be circulated through outer portions of the still to establish a thermal gradient, the center of the still to the outer portions thereof thereby, required for efficient still operation. Finally, the product liquid and effluent are circulated through a heat exchanger for purposes of transferring heat to incoming source liquid. The treated source liquid circulated through the still for purposes of promoting heat transfer represents a valuable material by virtue of its treatment and heat content and is recirculated through the deaerator in combination with incoming treated and preheated source liquid for circulation through the still.

It should be apparent that the system of the present invention provides for improved efficiency of distillation of salt water to produce distilled water as a result of utilization of the treated, deaerated source liquid for heating together with vaporization thereof taking place to produce product liquid at the first stage (or stages) of the still, and then recirculating the cooled liquid through the deaerator-heater in conjunction with fresh incoming source liquid. Accordingly, this recirculated source liquid needs less heat to bring it up to temperature, its having given up very little heat in its first circulation, and additionally, less heat is required to effect deaeration since the recirculated water is already deaerated. Additionally, the remaining heat content of the product withdrawn from the still is, in turn, transferred to incoming source liquid in the heat exchanger. Likewise the effluent which is the residue of source liquid that has had liquid extracted therefrom, contains heat which is also transferred to incoming source liquid by the heat exchanger. Consequently, a high degree of efficiency is realized both in the system and in the utilization of the system to perform the novel distillation described herein.

Since certain changes may be made in the above apparatus and method without departing from the scope of the invention herein involved, it is intended that all matter contained in the above description or shown in the accompanying drawings shall be interpreted as illustrative and not in a limiting sense.

What is claimed is:

1. In a distillation system comprising a still including multiple stages each including a microporous vapor permeable membrane through which vapor of a distilland liquid in contact with one side of said membrane is transferred through said membrane and condensed in contact with the opposite side thereof to form distillate, the improvement comprising, in combination:

said multiple stage still including means for receiving the heated feed liquid and conducting a portion of said feed liquid through stages of said still as distilland in contact with said membranes, means for conducting another portion of said feed liquid through a first section of said still for transferring heat to said distilland to vaporize the latter, means for conducting effluent from said still, said effluent consisting of distilland from which vapor has been transferred, and means for separately conducting said other portion of said feed liquid from said still following transfer of heat therefrom;

liquid treatment means including means for heating said feed liquid;

means for circulating said feed liquid through said liquid treatment means and introducing said feed liquid into said means within said still for receiving said feed liquid; and means for introducing said other portion of said feed liquid withdrawn from said still into said liquid treatment means in combination with additional liquid from said source.

2. A distillation system as defined in claim 1 wherein said liquid treatment means include a deaerator heater.

3. A distillation system as defined in claim 1 wherein said still includes means for circulating a coolant liquid through a second section of said still for transferring heat from said distillate.

4. A distillation system as defined in claim 3 wherein said first section of said still includes at least a passage between said membranes near the center of said still and said second section includes passages located near the exterior of said still for establishing a thermal gradient across said membranes outwardly from said first section.

5. A distillation system as defined in claim 4 wherein said still includes a distilland passage adjacent each of said membranes for conducting said feed liquid in contact with said each membrane and said first section of said still has a flow capacity substantially exceeding the combined flow capacity of a plurality of said distilland passages.

6. A distillation system as defined in claim 1 wherein said still comprises a multiplicity of said membranes and impermeable films arranged in alternating, stacked relation outwardly from a pair of said membranes and said first section of said still comprises at least a heating channel bounded on opposite sides by said pair of said membranes.

7. A distillation system as defined in claim 6 wherein each of said films cooperates with one of said membranes to form a distilland channel for conducting said distilland in contact with said membrane and the flow capacity of said heating channel is greater than the combined flow capacity of a plurality of said distilland channels.

8. A distillation system as defined in claim 6 wherein said still includes coolant passages each bounded on one side by the outer impermeable films of said still, said system including means for circulating a coolant liquid through said coolant channels to establish thermal gradients across said stacked membranes and said impermeable films outwardly from said first section of said still.

9. A distillation system as defined in claim 1 including heat exchange means for transferring heat between liquids;

means for circulating liquid from a source through said heat exchange means to said liquid treatment means;

means for separately circulating said effluent and said distillate liquids through said heat exchange means to transfer heat from said effluent and distillate liquids to said liquid from said source.

10. In a method of distillation in which liquid supplied from a source is subjected to treatment including heating and deaeration in a deaerator heater and is circulated as feed liquid at a relatively low volume rate of flow through each of a multiplicity of distilland channels each bounded on one side by a microporous membrane to transfer vapor from said feed liquid through said membrane to one of a multiplicity of distillate channels bounded on one side by the other side of said each membrane, the vapor of said feed liquid is condensed to form distillate liquid in said distillate channels, and heat is transferred from distillate in each of said distillate channels to the feed liquid in a succeeding distilland channel to vaporize the latter, the improvement comprising, in combination:

transferring to the environment heat from distillate in the last of a succession of said distillate channels; and circulating a portion of said liquid from said deaerator at a relatively high volume rate of flow through a heating channel defined at least on one side by one of said membranes to establish a temperature gradient across a succession of said distillate and distilland channels, arranged at alternating order, from said heating channel to said last distillate channel.

11. A distillation method as defined in claim 10 including the steps of withdrawing said liquid from said heating channel following circulation of said liquid therethrough and recirculating said liquid withdrawn from said heating channel together with additional liquid from said source through said deaerator to heat both of said liquids and deaerate said additional liquid.

12. A distillation method as defined in claim 11 including the steps of withdrawing said feed liquid and said distillate liquid from said distilland and distillate channels, respectively, and circulating separately through a heat exchanger, said feed and distillate liquids withdrawn from said distilland and distillate channels and said additional liquid from said source to transfer heat from said feed and distillate liquids to said additional liquid prior to circulating the latter through said heat exchanger.

13. A distillation system as defined in claim 10 wherein vapor is transferred from said liquid during circulation thereof through said heating channel, across said membrane defining a side of said heating channel to a distillate channel and is condensed in the latter to form distillate.

14. A distillation system as defined in claim 10 wherein heat is transferred to the environment from a plurality of said distillate channels each of which is the last of a succession of said distillate channels arranged outwardly in alternating order with distilland channels from said heating channel to establish and maintain temperature gradients across said successions of said distillate and distilland channels.

15. A distillation system as defined in claim 10 wherein said liquid from said source is water containing dissolved solids.

* * * * *